US012807436B2

(12) United States Patent
Posselius et al.

(10) Patent No.: US 12,807,436 B2
(45) Date of Patent: Nov. 24, 2026

(54) SUPPORT VEHICLE FOR AN AGRICULTURAL SYSTEM

(71) Applicant: CNH Industrial America LLC, New Holland, PA (US)

(72) Inventors: John H. Posselius, Ephrata, PA (US); Todd Sarkis Aznavorian, Chagrin Falls, OH (US); Tyson J. Dollinger, Mazon, IL (US); Christopher Alan Foster, Mohnton, PA (US); Brian Robert Ray, Chicago, IL (US); Adam Robert Rusciolelli, Chicago, IL (US); Nadav Y Daniel, Deerfield, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 2104 days.

(21) Appl. No.: 16/303,525

(22) PCT Filed: May 19, 2017

(86) PCT No.: PCT/US2017/033644
§ 371 (c)(1),
(2) Date: Nov. 20, 2018

(87) PCT Pub. No.: WO2017/205218
PCT Pub. Date: Nov. 30, 2017

(65) Prior Publication Data

US 2020/0324985 A1 Oct. 15, 2020

Related U.S. Application Data

(60) Provisional application No. 62/340,898, filed on May 24, 2016.

(51) Int. Cl.
*B65G 67/24* (2006.01)
*A01C 15/00* (2006.01)

(52) U.S. Cl.
CPC ............ *B65G 67/24* (2013.01); *A01C 15/003* (2013.01); *B65G 2814/0302* (2013.01); *B65G 2814/0326* (2013.01); *B65G 2814/0344* (2013.01)

(58) Field of Classification Search
CPC .... B65G 2814/0344; B65G 2814/0302; B65G 67/24
See application file for complete search history.

(56) References Cited

U.S. PATENT DOCUMENTS 5,586,030 A 12/1996 Kemner et al.
5,712,782 A 1/1998 Weigelt et al.
(Continued)

FOREIGN PATENT DOCUMENTS

WO 2012041621 A1 4/2012
WO 2013043963 A1 3/2013
WO 2015065282 A1 5/2015

OTHER PUBLICATIONS

Scheuren, et al.; "Infield Path Planning for Autonomous Unloading Vehicles"; Robotics Innovation Center, German Research Center for Artificial Intelligence, DFKI Bremen Robert-Hooke-Straße 5, 28359 Bremen, Germany; Oct. 16, 2013.
(Continued)

*Primary Examiner* — Saul Rodriguez
(74) *Attorney, Agent, or Firm* — Fletcher Yoder, P.C.

(57) ABSTRACT

A system for refilling a resource of an agricultural system includes the agricultural system including a tank that stores the resource. The system also includes a support vehicle including a container that stores the resource, a locating system that outputs a first signal indicative of a position of the support vehicle, a transfer system that includes a resource transfer device, and a controller communicatively coupled to the locating system and the transfer system including a processor and a memory. The controller deter-
(Continued)

mines a target location in a field to position the support vehicle, control the support vehicle such that the support vehicle is directed toward the target location, and instruct the transfer system to activate the resource transfer device to transfer the resource from the container to the tank while the position of the agricultural system is within a threshold distance of the target location.

20 Claims, 8 Drawing Sheets

(56) References Cited

U.S. PATENT DOCUMENTS

| | | | |
|---|---|---|---|
| 5,974,348 | A | 10/1999 | Rocks |
| 6,141,614 | A | 10/2000 | Janzen et al. |
| 6,216,071 | B1 | 4/2001 | Motz |
| 7,277,784 | B2 | 10/2007 | Weiss |
| 8,407,157 | B2 | 3/2013 | Anderson |
| 8,437,901 | B2 | 5/2013 | Anderson |
| 8,442,700 | B2 | 5/2013 | Anderson |
| 2006/0150584 | A1 | 7/2006 | Weiss |
| 2007/0129869 | A1 | 6/2007 | Gudat et al. |
| 2009/0216410 | A1 | 8/2009 | Allen et al. |
| 2010/0063651 | A1 | 3/2010 | Anderson |
| 2011/0084851 | A1 | 4/2011 | Peterson et al. |
| 2012/0085458 | A1 | 4/2012 | Wenzel |
| 2013/0019580 | A1 | 1/2013 | Anderson et al. |
| 2013/0046525 | A1 | 2/2013 | Ali et al. |
| 2013/0325242 | A1 | 12/2013 | Cavender-Bares et al. |
| 2015/0362922 | A1* | 12/2015 | Dollinger ............. G05D 1/0291 701/2 |

OTHER PUBLICATIONS

PCT International Search Report and Written Opinion of International Application PCT/US2017/033644; mailed Aug. 7, 2017; 13 pages.

TORC Robotics; "ByWire Kits Used for the Kinze Autonomous Grain Cart System"; 2012; Retrieved on Oct. 16, 2013 from http://www.gil-net.de/Publikationen/25_295-298.pdf.

* cited by examiner

SUPPORT VEHICLE FOR AN AGRICULTURAL SYSTEM

CROSS-REFERENCE TO RELATED APPLICATION

This is a national phase of PCT Application No. PCT/US17/33644, entitled "Support Vehicle for an Agricultural System", filed on May 19, 2017, which is a continuation of U.S. Provisional Application No. 62/340,898, filed May 24, 2016, entitled "Support Vehicle for an Agricultural System," the contents of each of which are incorporated by reference in their entireties for all purposes.

BACKGROUND

The present disclosure relates generally to a support vehicle for an agricultural vehicle. In particular, disclosed embodiments include using a support vehicle to refill a resource used by an agricultural system.

An agricultural system, such as an agricultural vehicle and/or an agricultural implement, may be used to produce, cultivate, and/or harvest crops in a field. However, the agricultural system stores a finite amount of resource(s) used for operation. For example, in tillage operations, the resource may be fuel for the agricultural vehicle towing a tillage implement. For application operations (e.g., spraying, fertilizing, planting, seeding, etc.), the resources may include fuel, fertilizer, seeds, or a combination thereof, among other resources. The resources are often delivered to the field and then manually transferred to the agricultural system at a location within or proximate to the field. Because of the remote locations and the corresponding larger travel distances to and within the fields, refilling the resources of the agricultural system may be slow and inefficient, thereby reducing the efficiency of crop production.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a system for refilling a resource of an agricultural system includes the agricultural system that includes a tank configured to store the resource. The system also includes a support vehicle that includes a container configured to store the resource. The support vehicle also includes a locating system configured to output a first signal indicative of a position of the support vehicle. The support vehicle further includes a transfer system that includes a resource transfer device. The support vehicle also includes a controller communicatively coupled to the locating system and the transfer system, wherein the controller includes a processor and a memory. The controller is configured to determine a target location in a field to position the support vehicle based at least in part on an entry point of the field, control the support vehicle such that the support vehicle is directed toward the target location based at least in part on the first signal, and instruct the transfer system to activate the resource transfer device to transfer the resource from the container to the tank while the position of the agricultural system is within a threshold distance of the target location.

In a second embodiment, a support vehicle for refilling a resource of an agricultural system includes a container configured to store the resource. The support vehicle also includes a locating system configured to output a first signal indicative of a position of the support vehicle. The support vehicle further includes a transfer system comprising a resource transfer device. The support vehicle also includes a controller communicatively coupled to the locating system and the transfer system, wherein the controller comprises a processor and a memory. The controller is configured to determine a target location in a field to position a support vehicle based at least in part on terrain, obstacles, crops, or any combination thereof, in the field. The controller is also configured to control the support vehicle such that the support vehicle is directed toward the target location. The controller is further configured to instruct the transfer system to activate the resource transfer device to transfer the resource from the container to a tank of the agricultural system while the position of the agricultural system is within a threshold distance of the target location.

In a third embodiment, a method for refilling a resource of an agricultural system includes determining a target location in a field to position a support vehicle based at least in part on a path of the agricultural system. The method also includes controlling the support vehicle such that the support vehicle is directed toward the target location. The method further includes instructing a transfer system of the support vehicle to activate a resource transfer device of the transfer system to transfer the resource from a container of the support vehicle to a tank of the agricultural system while the position of the agricultural system is within a threshold distance of the target location.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
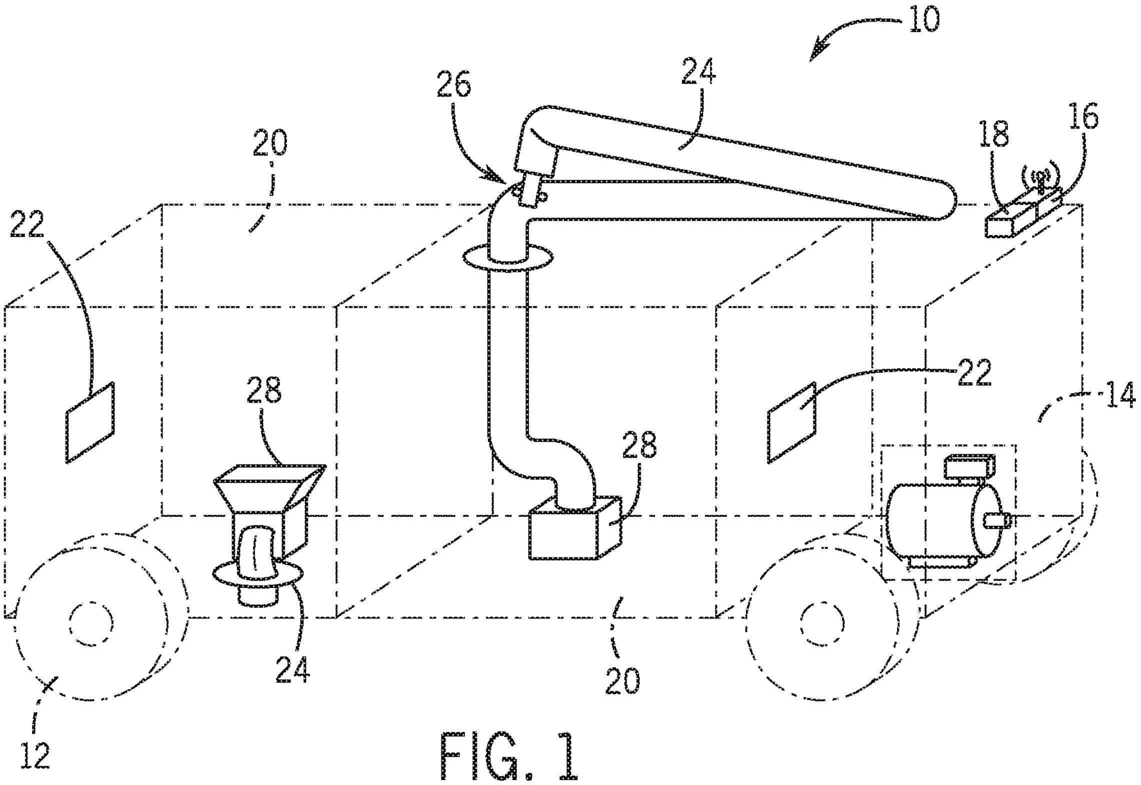
FIG. 1 is a diagram of a support vehicle for an agricultural system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Bringing a resource to a field for an agricultural system and manually transferring the resource to the system may be slow and inefficient. Accordingly, a support vehicle, as described in the present disclosure may store one or more resources used by the agricultural system during operation, and automatically dock and transfer the one or more resources to the agricultural system, thus increasing the speed of refilling operations and reducing labor costs. As such, the agricultural system may spend less time refilling resources and more time operating in the field, resulting in increased production time and efficiency. In particular, one embodiment of the present disclosure includes a system for refilling a resource of an agricultural system includes the agricultural system that includes a tank configured to store the resource. The system also includes a support vehicle that includes a container configured to store the resource. The support vehicle also includes a locating system configured to output a first signal indicative of a position of the support vehicle. The support vehicle further includes a transfer system that includes a resource transfer device. The support vehicle also includes a controller communicatively coupled to the locating system and the transfer system, wherein the controller includes a processor and a memory. The controller is configured to determine a target location in a field to position the support vehicle based at least in part on an entry point of the field, control the support vehicle such that the support vehicle is directed toward the target location based at least in part on the first signal, and instruct the transfer system to activate the resource transfer device to transfer the resource from the container to the tank while the position of the agricultural system is within a threshold distance of the target location. It should be noted that although the concepts described herein are shown and described with reference to a resource to an agricultural system, the present disclosure is not limited to such applications, but may apply to other systems, such as vehicles operating in construction applications, military applications, storage applications, industrial applications, mining applications, and so forth.

FIG. 1 is a diagram of a support vehicle 10 for an agricultural system, in accordance with an embodiment of the present disclosure. The support vehicle 10 includes wheels 12 that enable the support vehicle 10 to travel over terrain. In some embodiments, the support vehicle 10 may include transport devices/systems instead or in addition to the wheels 12, such as tracks. The support vehicle 10 may be autonomous or passive. The autonomous support vehicle includes a speed control system (e.g., that includes an engine 14) and a steering control system. The passive support vehicle may not include the engine 14, and may instead include hitch assembly configured to engage a vehicle, such as a tractor, configured to tow the support vehicle 10 to a location within or proximate to a field.

The support vehicle 10 includes a communication system 16 that may be used to send and receive data. In some embodiments, the communication system 16 may be used to communicate with the agricultural system, a communications base station and/or an administrative or back office system (e.g., for logistic purposes). The support vehicle 10 includes a locating system 18 that determines a position, orientation, speed, and/or direction of the support vehicle 10. For example, the locating system 18 may receive a global navigation satellite system (GNSS) signal, such as a global positioning system (GPS) signal or a different type of GNSS signal, a different type of positioning signal, or the like.

The support vehicle 10 includes one or more containers 20 for storing the various resources used by the agricultural system. For instance, the one or more containers 20 may be used to store fuel, water, chemicals, fertilizer, seeds, and the like. The support vehicle 10 also includes a sensor system that includes one or more sensors 22 associated with the one or more containers 20. Each sensor 22 may determine a level of the resource remaining within the respective container 20. The sensors 22 may also include accelerometer(s), gyroscope(s), or other devices that may output signal(s) indicative of the speed, acceleration, roll, pitch, yaw, pitch rate, yaw rate, roll rate, or a combination thereof, of the support vehicle 10. The sensor(s) 22 may include proximity sensor(s) (e.g., capacitance sensors, etc.) that identify and/or detect characteristics of objects, vehicles, terrain, or a combination thereof, that are in proximity to the support vehicle 10. In some embodiments, the proximity may be based at least in part on a threshold proximity. For example, the threshold proximity may be a range of 1 inch to 12 feet (e.g., 3 inches, 6 inches, 9 inches, 1 foot, 1.5 feet, 2 feet, 3 feet, 5 feet, etc.). If the object, vehicle, terrain, etc. is within the threshold proximity (e.g., 6 inches), then the sensor(s) 22 identify and/or detect characteristics of the object, vehicle, terrain, etc.

The support vehicle 10 includes one or more resource transfer devices 24 for transferring a resource(s) to the agricultural system. For example, the resource transfer device(s) 24 may include a conveyer, a gravity drop feed, a funneling mechanism, a tube, an arm, an extendable tube, an extendable arm, and the like. As illustrated, the resource transfer device 24 is an extendable arm located on the top surface of the support vehicle 10. In some embodiments, the resource transfer device 24 may be located on any portion of the support vehicle 10, such as the front surface, the bottom surface, a side surface, etc. The one or more resource transfer devices 24 may transfer the resource(s) automatically (i.e., without operator intervention). Each resource transfer device 24 may be configured to transfer a resource from one or more containers 20 to the agricultural system. In some embodiments, each resource transfer device 24 may transfer a resource from multiple containers 20. In some embodiments, each resource transfer device 24 may transfer a resource from multiple containers 20 and receive instructions from a controller of the support vehicle 10 to transfer a resource from any one container 20 or any combination of containers (e.g., sequentially). FIG. 1 illustrates two different resource transfer devices 24, the gravity drop feed and the extendable tube. A distal end of the extendable tube resource transfer device 24 (relative to the support vehicle 10) may include a docking mechanism 26 that enables the extendable tube resource transfer device 24 to couple to a resource receptacle of the agricultural system. The docking mechanism 26 may couple to the resource receptacle of the agricultural system automatically (i.e., without operator intervention). For example, the extendable tube resource transfer device 24 configured to transfer fuel may include a docking mechanism 26 that couples to fuel tank opening of a tractor or other powered vehicle. In some embodiments, the resource transfer device 24, such as the gravity drop feed resource transfer device 24, may not include the docking mechanism 26. For example, the agricultural system may include a resource receptacle that receives a resource through the resource receptacle without using a docking mechanism (e.g., a loading receptacle at an end of a conveyer of an air cart). In this example, the gravity drop feed resource transfer device 24 is aligned with the resource receptacle and drops the resource to the resource receptacle once aligned. The resource transfer device 24 is coupled to a resource transfer support device 28, such as a pump, a blower, a fan, a feeding auger, and the like. The resource transfer support device 28 conveys, assists in conveying, or increases flow of the resource from the respective container 20 into the respective resource transfer device 24 and to the agricultural system. The resource transfer support device 28 may transfer the respective resource automatically (i.e., without operator intervention). As illustrated, each resource transfer support device 28 corresponds to a resource transfer device 24. In some embodiments, a resource transfer support device 28 may correspond to multiple resource transfer devices 24.

Figure 2:
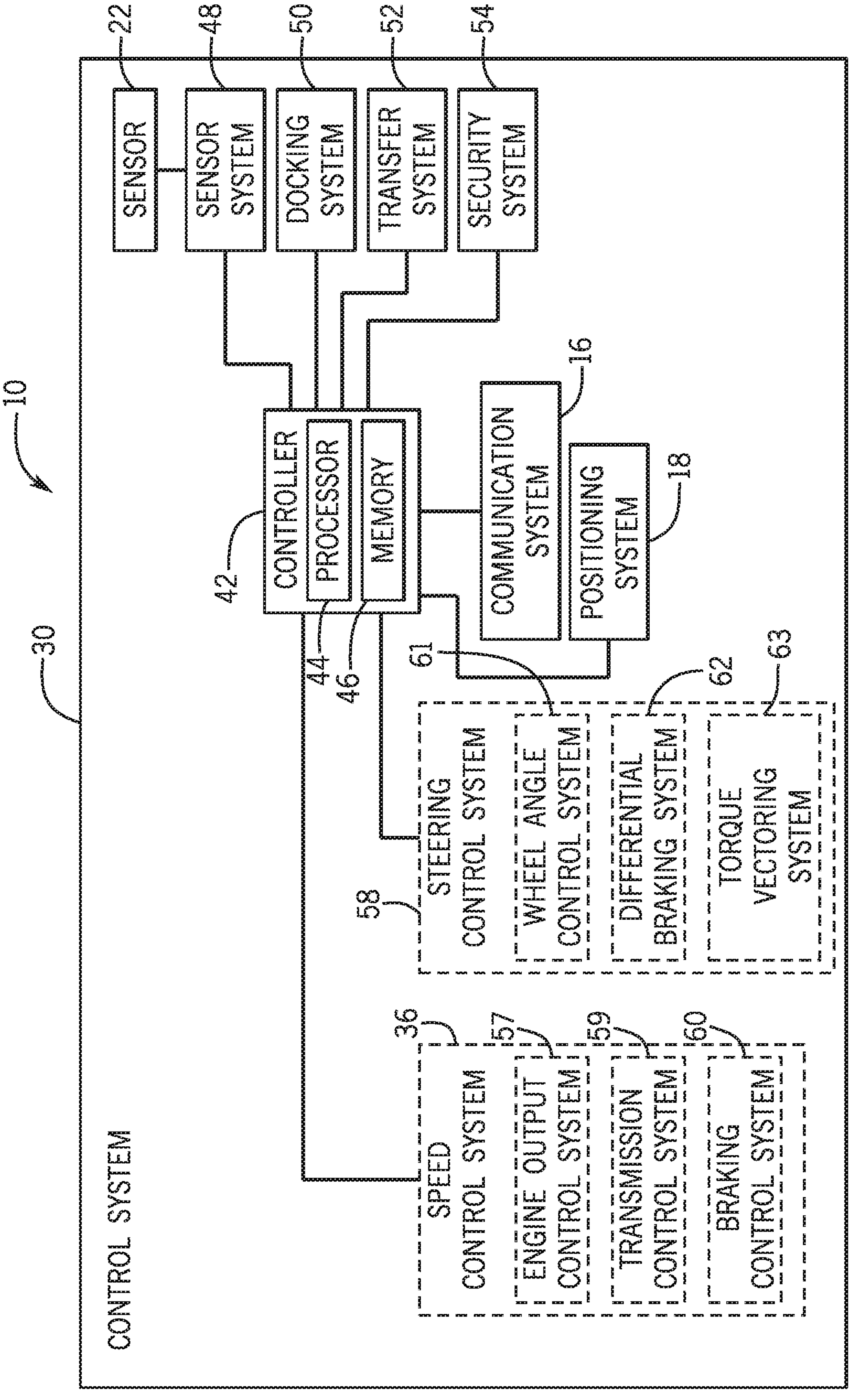
FIG. 2 is a block diagram of a control system for the support vehicle of FIG. 1, in accordance with an embodiment of the present disclosure.

FIG. 2 is a block diagram of a control system for the support vehicle 10 of FIG. 1, in accordance with an embodiment of the present disclosure. The control system 30 includes a controller 42 that may gather information from and issue instructions to various components of the support vehicle 10. The controller 42 includes a processor 44 (e.g., a microprocessor) that may execute software, such as software for controlling the support vehicle 10. Moreover, the processor 44 may include multiple microprocessors, one or more "general-purpose" microprocessors, one or more special-purpose microprocessors, and/or one or more application specific integrated circuits (ASICS), or some combination thereof. For example, the processor 44 may include one or more reduced instruction set (RISC) processors. The controller 42 also includes a memory device 46 that may store information such as control software, look up tables, configuration data, etc. The memory device 46 may include a volatile memory, such as random access memory (RAM), and/or a nonvolatile memory, such as read-only memory (ROM). The memory device 46 may store a variety of information and may be used for various purposes. For example, the memory device 46 may store processor-executable instructions (e.g., firmware or software) for the processor 44 execute, such as instructions for controlling the support vehicle 10. In some embodiments, the memory device 46 is a tangible, non-transitory, machine-readable-medium that may store machine-readable instructions for the processor 44 to execute. The memory device 46 may include ROM, flash memory, a hard drive, or any other suitable optical, magnetic, or solid-state storage medium, or a combination thereof. The memory device 46 may store data (e.g., position data, identification data, etc.), instructions (e.g., software or firmware for controlling the support vehicle, etc.), and any other suitable data.

The controller 42 may operate, modify, store, or a combination thereof, a variety of data related to the support vehicle 10, and, in certain embodiments, the agricultural system(s). For example, the data may include identification information (e.g., an identification tag such as a number or name) of the support vehicle 10, and, in certain embodiments, other systems, such as the agricultural system(s). The data may include resource identification information that may enable the controller 42 to identify and distinguish resources. The data may include resource level information indicating a remaining level of each resource stored in the container(s) 20 of the support vehicle 10 and/or in the agricultural system(s). The data may also include a state of the support vehicle 10, such as an availability state indicating whether the support vehicle 10 is available for docking. The data may include position information (e.g., in latitude/longitude format) as determined based on input from the locating system 18 of the support vehicle 10. The data may include orientation information, such as data related to roll, pitch, yaw, pitch rate, yaw rate, roll rate, or a combination thereof, of the support vehicle 10. The data may include speed information that indicates a speed and/or an acceleration of the support vehicle 10. The orientation information and/or speed information may be based at least in part on information received from the locating system 18, the sensor system 48, or a combination thereof. The data may include proximity data that identifies and/or detects characteristics of objects, vehicles, terrain, or a combination thereof, that are in proximity to the support vehicle 10. The controller 42 may enable modifying or inputting data related to the support vehicle 10 by an operator (e.g., selecting a configuration stored in the memory device 46). For example, an interface, such as a multimedia interface (MMI), remotely located from the support vehicle 10 (e.g., at a communications base station) may provide input to and/or receive output from the controller 42 via the communication system 16.

The controller 42 is communicatively coupled to the communication system 16 that sends and receives information over a communication network, such as WiFi, a proprietary protocol, and the like. In some embodiments, the communication system 16 enables a wireless exchange of information (e.g., between the controller 42 and a controller of the agricultural system). The communication system 16 may enable the controller 42 to send and receive information related to operation of the support vehicle 10, the agricultural system(s), and the like. For example, the communication system 16 enables the controller 42 to send the identification information, the availability state, the position information, the orientation information, the speed information, the resource identification information, the resource level information, or any combination thereof, to a controller of the agricultural system. In some embodiments, the communication system 16 may be used to send logistics and/or telematics information to the agricultural system(s), to a communications base station, to an administrative or back office system, or a combination thereof.

The controller 42 is communicatively coupled to the sensor system 48 that includes the one or more sensors 22. The sensor system 48 may determine vehicle position, vehicle orientation, resource level(s), the type of resource(s), the identity of systems (e.g., the agricultural system(s)), or any combination thereof, via the sensors 22. The sensor system 48 may enable the controller 42 to identify resources by determining resource identification information. For example, the sensor system 48 may receive an input from the sensor 22 based on reading an identification tag of the resource (e.g., via an optical representation of data (such as a barcode), a wireless device, or a combination thereof, corresponding to the resource that indicates and/or stores the identification tag). Likewise, the sensor system 48 may enable the controller 42 to identify agricultural systems by determining vehicle identification information. The sensor system 48 may also enable the controller 42 to properly align the support vehicle 10 for docking to the corresponding agricultural system. The sensor system 48 may enable the controller 42 to determine the speed, acceleration, roll, pitch, yaw, pitch rate, yaw rate, roll rate, or a combination thereof, of the support vehicle 10.

The controller 42 is communicatively coupled to the locating system 18 that receives signals indicative of a geographical location, orientation, speed, acceleration, roll, pitch, yaw, pitch rate, yaw rate, roll rate, or a combination thereof, of the support vehicle 10. The locating system 18 may receive a global navigation satellite system (GNSS) signal, such as a global positioning system (GPS) signal, a different type of positioning signal, or the like.

The controller 42 is communicatively coupled to a docking system 50 that controls the docking mechanism 26 located at the distal end of the resource transfer device 24 (relative to the support vehicle 10). The docking mechanism 26 enables the resource transfer device 24 to couple to a resource receptacle of the agricultural system. For example, after the support vehicle 10 is properly aligned with the agricultural system, the docking system 50 may instruct the docking mechanism 26 to couple to the resource receptacle of the agricultural system. In some embodiments, the docking system 50 may instruct the docking mechanism 26 to couple to the resource receptacle of the agricultural system automatically (i.e., without operator intervention) based on instructions from the controller 42. For example, the resource transfer device 24 configured to transfer fuel may include a docking mechanism 26 that couples to a fuel tank opening of a tractor or other powered vehicle. In some instances, the resource transfer device 24 may not include the docking mechanism 26. For example, the agricultural system may include a resource receptacle that receives the resource through the resource receptacle without docking. In these instances, the docking system 50 may perform a docking procedure wherein the resource receptacle of the agricultural system is aligned with the outlet of the resource transfer device 24.

The docking system 50 and/or the controller 42 may include docking information that includes procedures for docking with various resource receptacles. In some embodiments, the docking information may include distances dimensions, positions, or any combination thereof, of the agricultural system(s) and/or the resource receptacle(s) of the agricultural system(s) relative to the support vehicle 10, the resource transfer device(s) 24, and/or the docking mechanism(s) 26. For example, the resource transfer device 24 may be an extendable tube. The docking information may include a distance between the support vehicle 10 and the agricultural system, a position of the support vehicle 10, a position of the agricultural system, and a position of the resource receptacle of the agricultural system. The agricultural system may be moved into a docking position such that the distance between the support vehicle 10 and the agricultural system and the position of the agricultural system are met. When the sensor system 48 indicates that the distance between the support vehicle 10 and the agricultural system, the position of the support vehicle 10, and the position of the agricultural system are met, the controller 42 may instruct the docking system 50 to dock with the resource receptacle of the agricultural system. In some embodiments, the resource transfer device 24 is the extendable tube. The docking system 50 may instruct the extendable tube to extend and position the docking mechanism 26 (e.g., via hydraulic actuators) to couple to the resource receptacle of the agricultural system. The docking system 50 may use the position of the resource receptacle of the agricultural system (provided by the docking information) to instruct the extendable tube as to where to position the docking mechanism 26.

The controller 42 is communicatively coupled to a transfer system 52 that controls the transfer of resources from the containers of the support vehicle 10 to the agricultural system. The transfer system 52 may instruct a selected container 20 to open or close. The transfer system 52 may also instruct the resource transfer support device 28 (e.g., pump, blower, fan, feeding auger, and the like) to transfer or cease transferring the selected resource(s). The resource transfer support device 28 conveys, assists in conveying, or increases flow of the resource from the respective container 20 into the respective resource transfer device 24 and to the agricultural system. The resource transfer support device 28 may transfer the respective resource automatically (i.e., without operator intervention). In some embodiments, one resource transfer device 24 may transfer resources from multiple containers to the agricultural system. As such, the transfer system 52 may select a container 20 from the containers of the support vehicle 10, and instruct the resource transfer device 24 to couple to the selected container 20, such that resources are transferred from the container 20 to the agricultural system.

In certain embodiments, the controller 42 is communicatively coupled to a security system 54 that may verify the identity of the agricultural system, such that only an authorized agricultural system may dock with and/or receive the resources from the support vehicle 10. The security system 54 may substantially reduce or eliminate the possibility of resources of the support vehicle 10 being stolen. In some embodiments, the security system 54 may record unsuccessful attempts to dock with and/or receive resources from the support vehicle 10. In some embodiments, the security system 54 may send a notification (e.g., to a remote operator) and/or lock access to the resources of the support vehicle 10 if a threshold number of unsuccessful attempts is exceeded.

In some embodiments, the support vehicle 10 moves autonomously. That is, the support vehicle 10 may move and navigate without operator intervention. The autonomous support vehicle includes a speed control system 36 communicatively coupled to the controller 42. The controller may be configured to instruct the speed control system 56 to control a speed of the support vehicle 10. The speed control system 56 includes an engine output control system 57, a transmission control system 59, and a braking control system 60. The engine output control system 57 is configured to vary the output of an engine of the support vehicle 10 to control the speed of the support vehicle 10. For example, the engine output control system 57 may vary a throttle setting of the engine, a fuel/air mixture of the engine, a timing of the engine, and/or other suitable engine parameters to control engine output. In addition, the transmission control system 59 may adjust gear selection within a transmission to control the speed of the support vehicle 10. Furthermore, the braking control system 60 may adjust braking force, thereby controlling the speed of the support vehicle 10. While the illustrated speed control system 56 includes the engine output control system 57, the transmission control system 59, and the braking control system 60, it should be appreciated that alternative embodiments may include one or two of these systems, in any suitable combination. Further embodiments may include a speed control system 56 having other and/or additional systems to facilitate adjusting the speed of the support vehicle 10. The controller 42 may use positioning information received from the locating system 18, orientation information received from the sensor system 48, proximity information received from the sensor system 48, or any combination thereof, to control the speed and acceleration of the support vehicle 10.

The autonomous support vehicle may also include a steering control system 58 communicatively coupled to the controller 42. The controller may be configured to instruct the steering control system 58 to control a direction of the support vehicle 10. The steering control system 58 includes a wheel angle control system 61, a differential braking system 62, and a torque vectoring system 63. The wheel angle control system 61 may automatically rotate one or more wheels or tracks of the support vehicle 10 (e.g., via hydraulic actuators) to steer the support vehicle 10 along a path through the field (e.g., around a region having a high expected magnitude of slippage). By way of example, the wheel angle control system 61 may rotate front wheels/tracks, rear wheels/tracks, and/or intermediate wheels/tracks of the support vehicle 10, either individually or in groups. The differential braking system 62 may independently vary the braking force on each lateral side of the support vehicle 10 to direct the support vehicle 10 along the path through the field. Similarly, the torque vectoring system 63 may differentially apply torque from the engine to the wheels and/or the tracks on each lateral side of the support vehicle 10, thereby directing the support vehicle 10 along the path through the field. While the illustrated steering control system 58 includes the wheel angle control system 61, the differential braking system 62, and the torque vectoring system 63, it should be appreciated that alternative embodiments may include one or two of these systems, in any suitable combination. Further embodiments may include a steering control system 58 having other and/or additional systems to facilitate directing the support vehicle 10 along the path through the field (e.g., an articulated steering control system, etc.).

The controller 42 may use positioning information received from the locating system 18, orientation information received from the sensor system 48, proximity information received from the sensor system 48, or any combination thereof, to control the direction of travel of the support vehicle 10. In some embodiments, the controller 42 may access information related to the working area and roadways to navigate to the working area. The information may be received via the communication system 16 and/or stored in the memory device 46. The controller 42 may instruct the steering control system 58 to control the direction of travel of the support vehicle 10. It should be noted that the procedures and actions described as performed by the controller 42 of the support vehicle 10 may also, or in the alternative, be performed wholly or in part by other controllers and/or control systems, such as controller(s) of the agricultural system(s), a communications base station, and the like.

While the communication system 16, the locating system 18, the sensor system 48, the docking system 50, the transfer system 52, the security system 54, the speed control system 56, and the steering control system 58 are each described as communicatively coupled to the controller 42 and performing functions separate from the controller 42, it should be noted that, in some embodiments, any and all of the functions described as performed by these systems may be alternatively or additionally performed by the controller 42.

Figure 3:
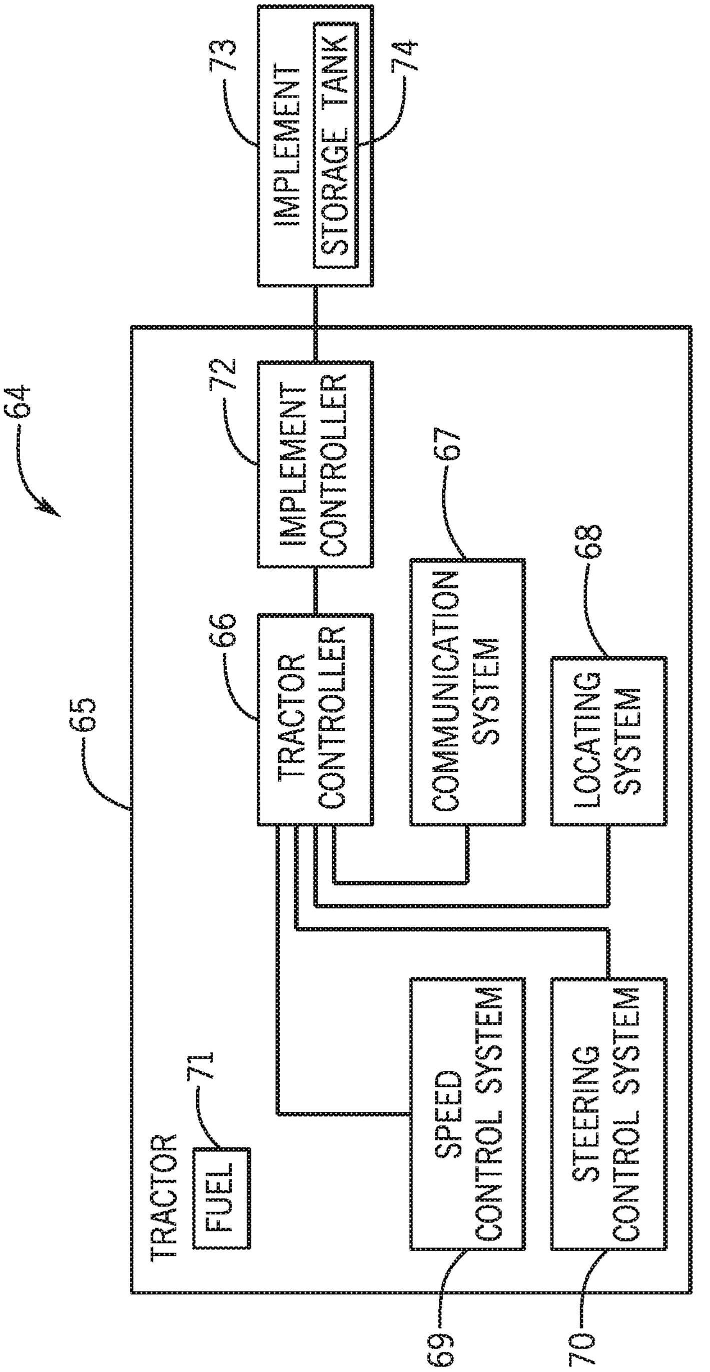
FIG. 3 is a block diagram of the agricultural system, in accordance with an embodiment of the present disclosure.

FIG. 3 is a block diagram of the agricultural system 64, in accordance with an embodiment of the present disclosure. The agricultural system 64 may include an agricultural vehicle 65, such as a tractor (either autonomous or passive). As illustrated, the tractor 65 includes a controller 66 that is communicatively coupled to a communication system 67, a locating system 68, a speed control system 69, and a steering control system 70. The communication system 67, the locating system 68, the speed control system 69, and the steering control system 70 may share any and all features and perform operations similar to the communication system, the locating system, the speed control system, and the steering control system of the support vehicle as illustrated in FIG. 2. The tractor 65 includes fuel 71 as a resource that is used when the tractor 65 operates. The tractor 65 may store the fuel 71 in a fuel tank. In some embodiments, the agricultural system 64 may include an implement 73, such as an air cart, a planter, or any other suitable agricultural implement. In such embodiments, the tractor 65 may include an implement controller 72 that is coupled to the implement 73. In some embodiments, the implement controller 72 may be included in the implement 73. In such embodiments, the tractor controller 66 may communicatively couple to the implement controller 72 (e.g., via a controller area network bus of the tractor 65). The implement 73 may include a storage tank 74, which stores resources used by the implement 73, such as fertilizer, seeds, etc.

Figure 4:
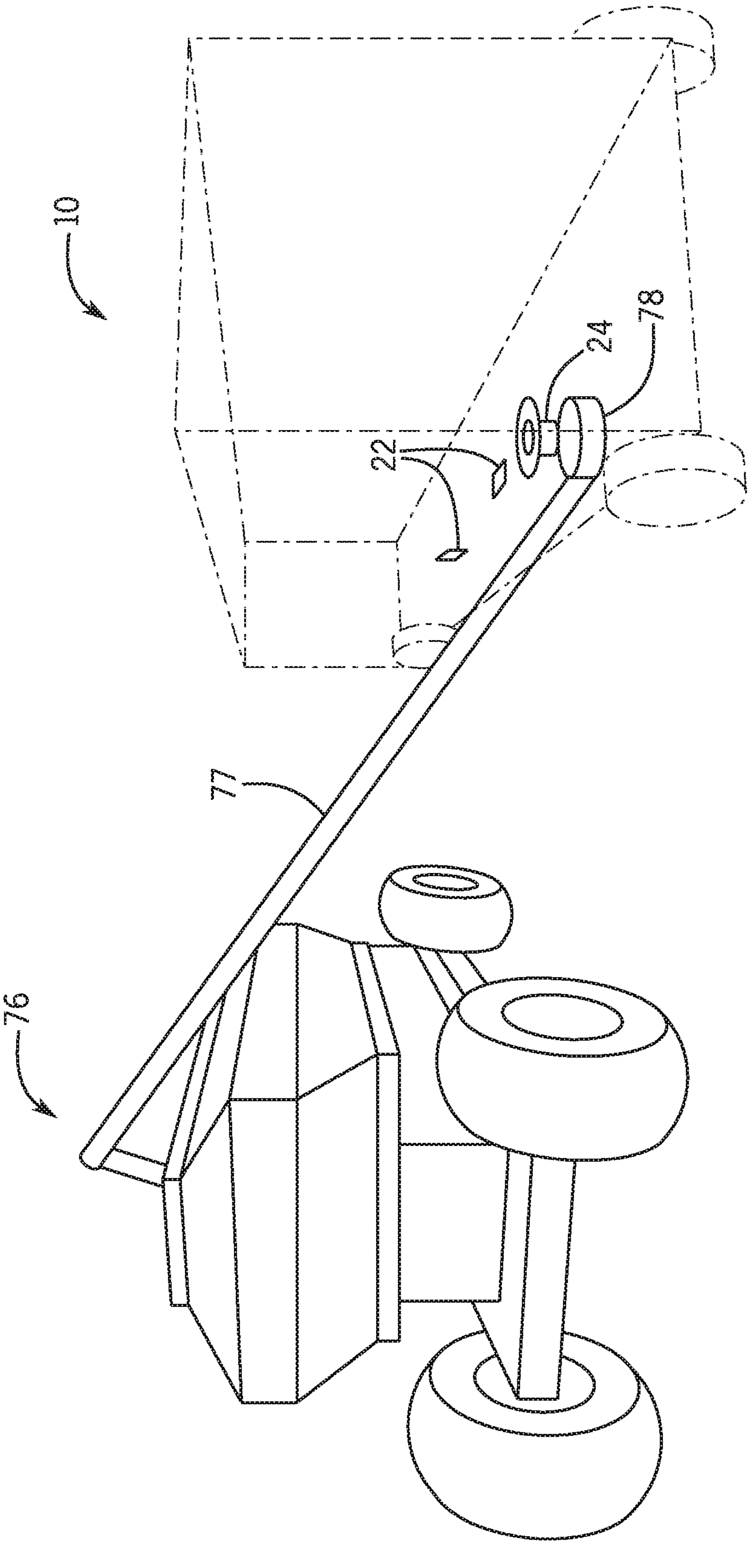
FIG. 4 is a schematic diagram of the support vehicle of FIG. 1 refilling a resource of an air cart, in accordance with an embodiment of the present disclosure.

FIG. 4 is a schematic diagram of the support vehicle 10 of FIG. 1 refilling a resource of an air cart 76, in accordance with an embodiment of the present disclosure. The air cart 76 is configured to meter and deliver agricultural product (e.g., seeds, fertilizer, etc.) to ground engaging tools of a seeding implement. In some embodiments, the controller of the support vehicle 10 aligns the support vehicle 10 for docking with the air cart 76 based on feedback from the sensor(s) 22. For example, the controller of the support vehicle may send signal(s) to guide the air cart 76 into proper alignment and/or indicate proper alignment. In some instances, the air cart 76 may be autonomous, semi-autonomous, or operator-driven. If the air cart 76 is autonomous or semi-autonomous (and docking of the air cart 76 is automatically performed by the controller of the air cart 76), the controller of the air cart 76 may send instructions (e.g., to a speed control system and/or a steering control system of the air cart 76) to align the air cart 76 with the support vehicle 10 based on feedback from the sensor(s) 22. If the air cart 76 is semi-autonomous (and docking of the air cart 76 is automatically performed by the controller of the air cart 76) or operator-driven, the operator of the air cart 76 may align the air cart 76 with the support vehicle 10 and indicate to the controller of the support vehicle 10 that the air cart 76 is properly aligned. For example, the support vehicle 10 may include an input device and/or mechanism (e.g., a button on the support vehicle 10 or a wireless signal received by the support vehicle 10) that the operator may activate to indicate that the air cart 76 is aligned. In some embodiments, docking is performed by the air cart 76 instead of or in combination with the docking system of the support vehicle 10.

In some embodiments, the support vehicle 10 may move to a desired location within or proximate to the field. The air cart 76 moves alongside the support vehicle 10. The controller of the support vehicle 10 may determine when the air cart 76 is aligned (e.g., docked) with the support vehicle 10. The controller of the support vehicle 10 may also determine when an outlet of the container of the support vehicle 10 is aligned with an inlet of the air cart 76. In the illustrated embodiment, the air cart 76 has a conveyer 77 with a loading receptacle 78 at a distal end of the conveyer 77 (relative to the air cart 76). As such, the illustrated resource transfer device 24 of the support vehicle 10 may not include a docking mechanism. Instead, the docking system of the support vehicle 10 may align the loading receptacle 78 of the air cart 76 with the resource transfer device 24 of the support vehicle 10. In some embodiments, the docking system may align the support vehicle 10 with the air cart 76. Once docked in this manner, the controller of the support vehicle 10 may instruct the transfer system to transfer a resource (e.g., seeds, fertilizer, fuel, etc.) to the resource receptacle 78 of the air cart 76 via the resource transfer device 24. In some embodiments, the support vehicle 10 may refill more than one resource of the air cart 76, such as seeds and fertilizer.

Figure 5:
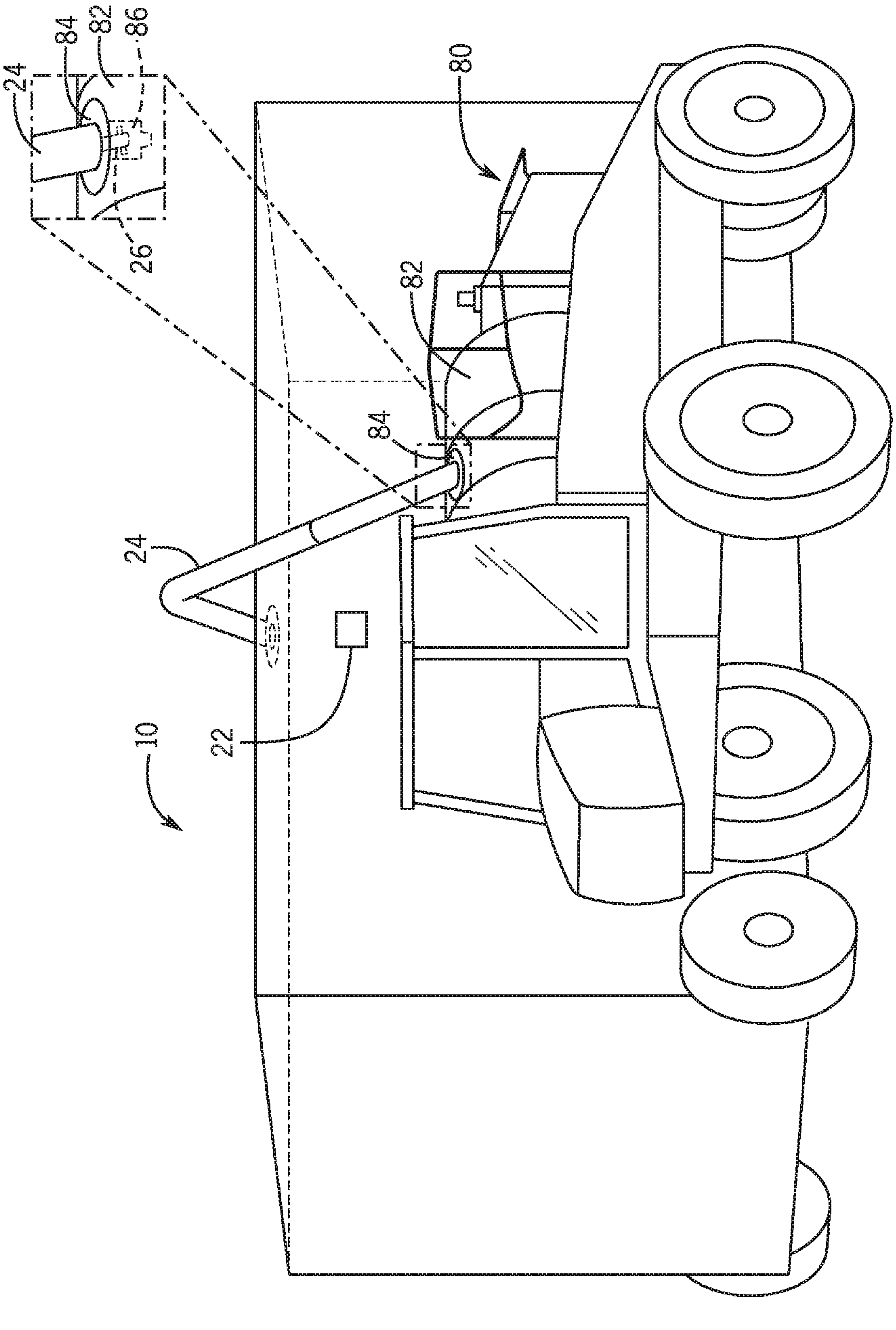
FIG. 5 is a schematic diagram of the support vehicle of FIG. 1 refilling a resource of a sprayer, in accordance with an embodiment of the present disclosure.

FIG. 5 is a schematic diagram of the support vehicle 10 of FIG. 1 refilling a resource of a sprayer 80, in accordance with an embodiment of the present disclosure. The sprayer 80 is configured to deliver fertilizer or other products to the surface of the field. As discussed above, the controller of the support vehicle 10 may align the support vehicle 10 for docking with the sprayer 80 based on feedback from the sensor(s) 22. In some embodiments, an operator of the sprayer 80 may align the sprayer 80 with the support vehicle 10 and indicate to the controller of the support vehicle 10 that the sprayer 80 is aligned. The controller of the support vehicle 10 may determine when the sprayer 80 is aligned (e.g., docked) with the support vehicle 10. After the sprayer 80 and the support vehicle 10 are aligned, the illustrated resource transfer device 24 (e.g., a conveyer) of the support vehicle 10 may engage a resource receptacle 84 (e.g., of a fertilizer storage tank 82, fuel tank, etc.) of the sprayer 80. In some embodiments, the docking is performed by the docking system of the support vehicle 10. In some embodiments, the resource transfer device 24 may include a docking mechanism 26 that mates with the resource receptacle 84 or a corresponding docking mechanism 86 of the tank 82. For example, the docking mechanism 26 of the resource transfer device 24 and the docking mechanism 86 of the resource receptacle 84 may be counterparts that interlock with one another upon engagement. The controller of the support vehicle 10 may also determine when an outlet of the container of the support vehicle 10 is aligned with an inlet of the sprayer 80. In some embodiments, docking is performed by the sprayer 80 instead of or in combination with the docking system of the support vehicle 10. Once docked, the controller of the support vehicle 10 may instruct the transfer system to transfer a resource (e.g., fertilizer, fuel, etc.) to the tank 82 of the sprayer 80 via the resource transfer device 24.

Figure 6:
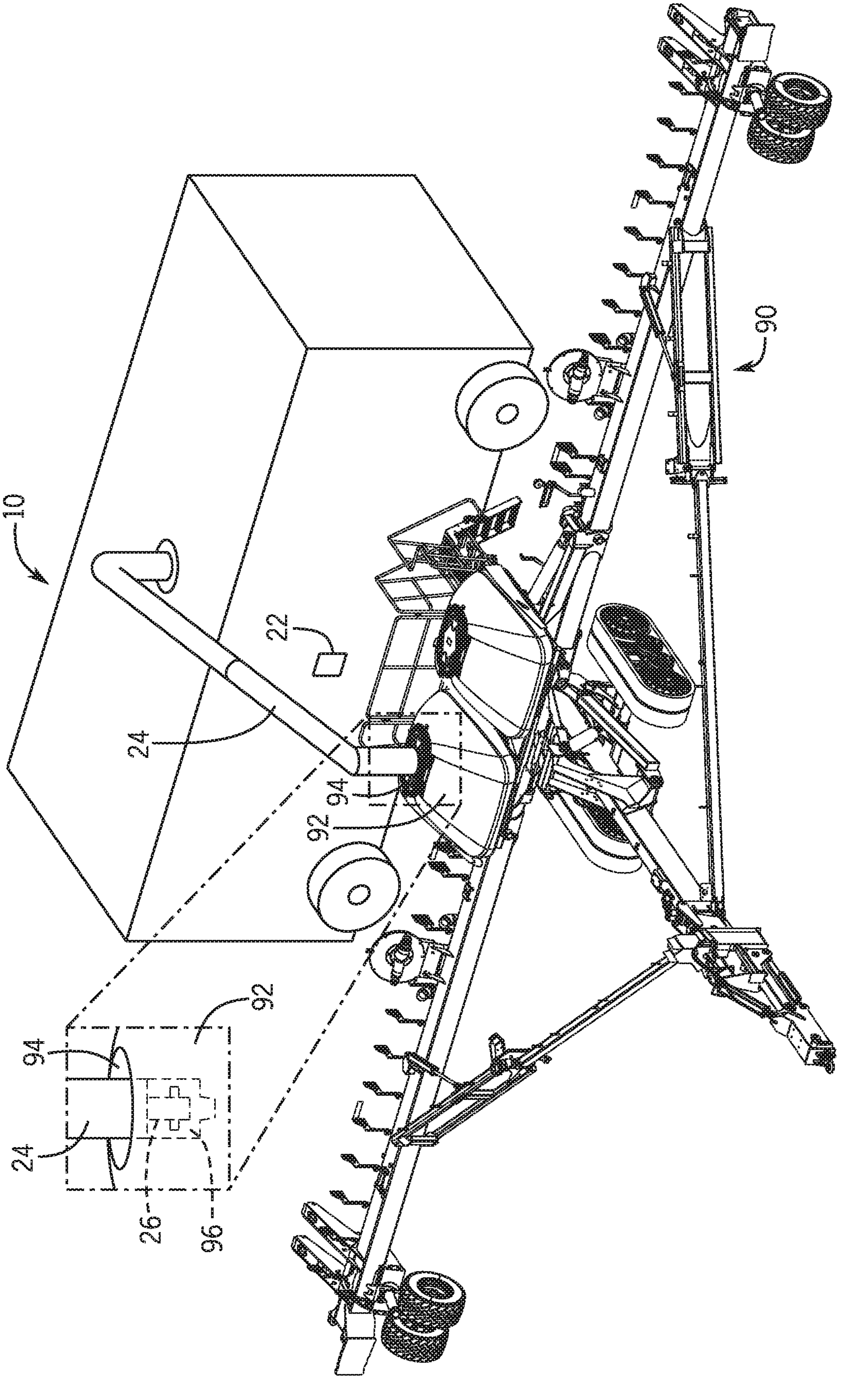
FIG. 6 is a schematic diagram of the support vehicle of FIG. 1 refilling a resource of a planter, in accordance with an embodiment of the present disclosure.

FIG. 6 is a schematic diagram of the support vehicle 10 of FIG. 1 refilling resources of a planter 90, in accordance with an embodiment of the present disclosure. The planter 90 is configured to deliver seeds, fertilizer, or other products to the field via ground engaging tools. As discussed above, the controller of the support vehicle 10 may align the support vehicle 10 for docking with the planter 90 based on feedback from the sensor(s) 22. In some embodiments, an operator of the planter 90 may align the planter 90 with the support vehicle 10 and indicate to the controller of the support vehicle 10 that the planter 90 is aligned. The controller of the support vehicle 10 may determine when the planter 90 is aligned (e.g., docked) with the support vehicle 10. After the planter 90 and the support vehicle 10 are aligned, the illustrated resource transfer device 24 (e.g., a conveyer) of the support vehicle 10 may dock with a resource receptacle 94 (e.g., of a fertilizer storage tank 92, seed hopper, fuel tank, etc.) of the planter 90. In some embodiments, the docking is performed by the docking system of the support vehicle 10. In some embodiments, the resource transfer device 24 may include a docking mechanism 26 that mates with the resource receptacle 94 or a corresponding docking mechanism 96 of the resource receptacle 94. For example, the docking mechanism 26 of the resource transfer device 24 and the docking mechanism 96 of the resource receptacle 94 may be counterparts that interlock with one another upon engagement. The controller of the support vehicle 10 may also determine when an outlet of the container of the support vehicle 10 is aligned with an inlet of the planter 90. In some embodiments, docking is performed by the planter 90 instead of or in combination with the docking system of the support vehicle 10. Once docked, the controller of the support vehicle 10 may instruct the transfer system to transfer a resource (e.g., fertilizer, fuel, etc.) to the tank 92 of the planter 90 via the resource transfer device 24.

Figure 7:
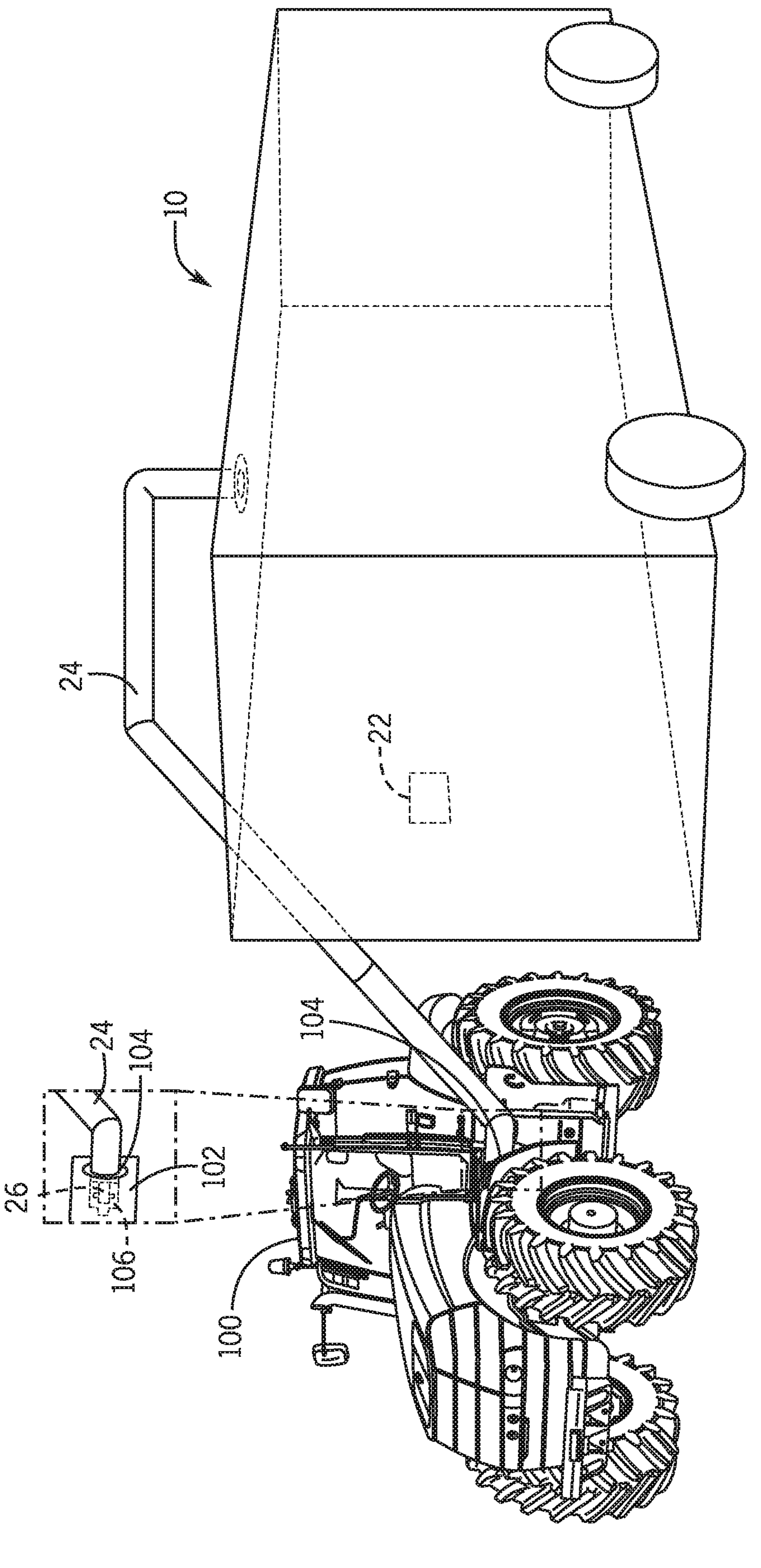
FIG. 7 is a schematic diagram of the support vehicle of FIG. 1 refilling a resource of a tractor, in accordance with an embodiment of the present disclosure.

FIG. 7 is a schematic diagram of the support vehicle 10 of FIG. 1 refilling a resource of a tractor 100, in accordance with an embodiment of the present disclosure. The tractor 100 may tow an agricultural implement across a field. As discussed above, the controller of the support vehicle 10 may align the support vehicle 10 for docking with the tractor 100 based on feedback from the sensor(s) 22. In some embodiments, an operator of the tractor 100 may align the tractor 100 with the support vehicle 10 and indicate to the controller of the support vehicle 10 that the tractor 100 is aligned. The controller of the support vehicle 10 may determine when the tractor 100 is aligned (e.g., docked) with the support vehicle 10. After the tractor 100 and the support vehicle 10 are aligned, the illustrated resource transfer device 24 of the support vehicle 10 (e.g., a tube) may dock with a fuel receptacle 104 of a fuel tank 102 of the tractor 100. In some embodiments, the docking is performed by the docking system of the support vehicle 10. In some embodiments, the resource transfer device 24 may include a docking mechanism 26 that mates with the fuel receptacle 104 or a corresponding docking mechanism 106 of the fuel receptacle 104. For example, the docking mechanism 26 of the resource transfer device 24 and the docking mechanism 106 of the fuel receptacle 104 may be counterparts that interlock with one another upon engagement. In some embodiments, docking is performed by the tractor 100 instead of or in combination with the docking system of the support vehicle 10. Once docked, the controller of the support vehicle 10 may instruct the transfer system to transfer the fuel to the tank 102 of the tractor 100 via the resource transfer device 24.

Figure 8:
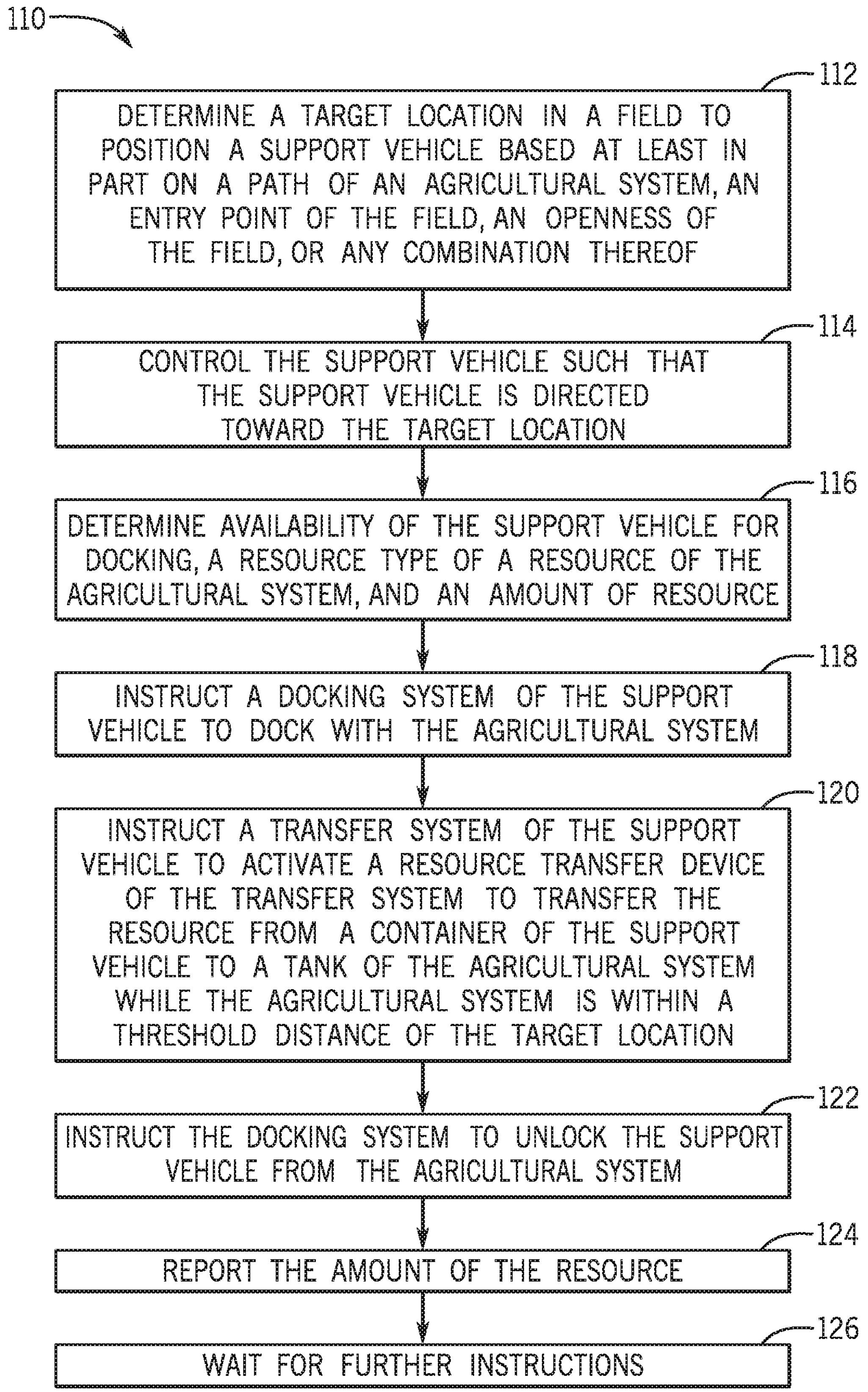
FIG. 8 is a flow diagram of a method for refilling a resource of an agricultural system, in accordance with an embodiment of the present disclosure.

FIG. 8 is a flow diagram of a method 110 for refilling a resource of an agricultural system, in accordance with an embodiment of the present disclosure. The support vehicle determines (block 112) a target location in the field to position the support vehicle based at least in part on a path of the agricultural system, an entry point of the field, an openness of the field, or any combination thereof. In some embodiments, the controller of the support vehicle may determine or receive a planned work path and an application rate of each resource of the agricultural system. The controller may then determine locations in the field where the resource of the agricultural system may decrease below a threshold level. For example, the threshold level of the resource may be a range under 20 percent (e.g., 1 percent, 1.5 percent, 3 percent, 5 percent, 10 percent, 12 percent, 15 percent, etc.) of a capacity of a storage tank of holding the resource. In some embodiments, the support vehicle may determine the target location based at least in part on field entry points proximate to the target location, such as driveways, crossings, etc. The support vehicle may determine the target location based at least in part on an openness of the target location, such that the agricultural system may navigate to the target location. For example, the openness of the target location may be determined based at least in part on terrain, obstacles, crops, or any combination thereof, of the field. In some embodiments, the controller may determine the target location based on any combination of the path of the agricultural system, the entry point of the field, the openness of the field, and a reduction of disturbance to crops in the field.

The controller then controls (block 114) the support vehicle such that the support vehicle is directed toward the target location. If the support vehicle is passive, then the support vehicle is towed to the target location (e.g., by an operator-driven or autonomous tractor), for example, with directions provided by the controller of the support vehicle. The support vehicle may provide an indication to an operator to be towed to the target location. If the support vehicle is autonomous, then the controller of the support vehicle may direct the support vehicle to the target location (e.g., via the speed control system and the steering control system of the support vehicle). The controller may direct the support vehicle to the target location via a path determined based at least in part on the planned work path of each resource of the agricultural system, the application rate of each resource of the agricultural system, the entry points proximate to the target location, the openness of the target location, the reduction of disturbance to crops in the field, or any combination thereof.

The controller determines (block 116) availability of the support vehicle for docking, a resource type of the resource, and amount of the resource. The controller may use the communication system of the support vehicle to send signal(s) indicating the availability of the support vehicle for docking, the resource type, and the amount of the resource to the agricultural system and/or a communications base station. The controller may determine the resource type by receiving resource identification information via the sensor system of the support vehicle. The controller may determine the amount of the resource by receiving resource level information via the sensor system or the communication system of the support vehicle.

The agricultural system may then proceed to the support vehicle for docking. In some embodiments, the support vehicle may proceed to the agricultural system for docking. In some embodiments, the agricultural system may be configured to take a path to the support vehicle that reduces disturbances to the field and/or avoids obstacles within the field. The controller instructs (block 118) the docking system of support vehicle to dock with the agricultural system. In some embodiments, the controller sends signal(s) to the agricultural system to guide the agricultural system into alignment and/or indicate alignment. In some embodiments, the controller aligns the support vehicle with the agricultural system. The docking may be performed by the docking system of the support vehicle. In some embodiments, the docking system may use the sensor system and/or the locating system of the support vehicle to determine when the agricultural system is aligned with the support vehicle. In some embodiments, docking is performed by the agricultural system instead of or in combination with the docking system of the support vehicle. In some embodiments, the resource transfer device of the support vehicle may not include a docking mechanism. In such embodiments, a loading receptacle of the agricultural system may be aligned with an outlet of the resource transfer device. In some embodiments, the controller may instruct a docking mechanism of the resource transfer device to engage or couple to a resource receptacle or a corresponding docking mechanism of the resource receptacle of the agricultural system.

The controller instructs (block 120) the transfer system of the support vehicle to activate the resource transfer device of the transfer system to transfer the resource from a container of the support vehicle to a tank of the agricultural system, while the agricultural system is within a threshold distance of the target location. For example, the threshold distance may be a distance where the resource transfer device may be within range of the agricultural system to successfully transfer the resource to the storage tank. The threshold distance may be dependent on the design and capabilities of the resource transfer device. The threshold distance may be, for example, a range of 1 inch to 4 feet (e.g., 3 inches, 6 inches, 9 inches, 1 foot, 1.5 feet, 2 feet, 3 feet, etc.).

Once transfer is complete, the controller may instruct (block 122) docking system to undock the support vehicle from the agricultural system. In some embodiments, the controller may instruct a docking mechanism of the resource transfer device to uncouple from a resource receptacle or a corresponding docking mechanism of the resource receptacle of the agricultural system. In some embodiments, the undocking may be performed by a docking system of the agricultural system.

The controller may report (block 124) the remaining amount of the resource to the agricultural system, other agricultural systems, a communications base station, an administrative or back office system, and the like. The support vehicle then awaits (block 126) further instruction. If the support vehicle is autonomous, the controller of the support vehicle or a communications base station may instruct the support vehicle to proceed to a resource area for refilling, to stay in its current position (e.g., to refill another agricultural system), to relocate to a new location in the same field, to relocate to a new location in another field, and the like. The instructions from the controller or the communications base station may be based at least in part on the amount of the resource remaining in the container of the support vehicle, the amount of resource remaining in the agricultural system, or any combination thereof. The controller of the support vehicle may update the availability status of the support vehicle based at least in part on the instruction(s) sent by the communications base station. If the support vehicle is passive, the communications base station may direct personnel to retrieve, refill, and/or relocate the support vehicle. In some embodiments, an operator may change the availability state of the passive support vehicle when the passive support vehicle is repositioned or proceeds to refill the resource.

As described, one support vehicle may be used to refill the resource of one or more agricultural systems. In some agricultural applications, multiple support vehicles may be used to refill the resource of the one or more agricultural systems. Also contemplated is using the support vehicle to refill multiple resources of the one or more agricultural systems (from multiple containers of the support vehicle), and using the multiple support vehicles to refill the multiple resources of the one or more agricultural systems.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for refilling a resource of an agricultural system, comprising:
- a support vehicle, comprising:
  - a container configured to store the resource;
  - a locating system configured to output a first signal indicative of a position of the support vehicle;
  - a transfer system comprising a resource transfer device; and
  - a controller communicatively coupled to the locating system and the transfer system, wherein the controller comprises a processor and a memory, and the controller is configured to:
    - determine a target location in a field to position the support vehicle based at least in part on an entry point of the field;
    - control the support vehicle such that the support vehicle is directed toward the target location based at least in part on the first signal; and
    - instruct the transfer system to activate the resource transfer device to transfer the resource from the container to the agricultural system while a position of the agricultural system is within a threshold distance of the target location.

2. The system of claim 1, wherein the support vehicle comprises multiple containers configured to store multiple resources.

3. The system of claim 1, wherein the support vehicle comprises a communication system communicatively coupled to the controller, wherein the communication system is configured to communicate with the agricultural system.

4. The system of claim 1, wherein the support vehicle comprises a sensor system communicatively coupled to the controller, wherein the sensor system comprises at least one sensor disposed within the container and configured to output a second signal indicative of an amount of the resource within the container.

5. The system of claim 4, wherein the controller is configured to receive the second signal from the at least one sensor and to determine the amount of the resource within the container based at least in part on the second signal.

6. The system of claim 1, wherein the resource transfer device comprises an arm.

7. The system of claim 6, wherein the support vehicle comprises a docking system communicatively coupled to the controller, wherein the docking system comprises a docking mechanism located at a distal end of the arm, and the controller is configured to instruct the docking system to engage the docking mechanism with a receptacle of the agricultural system.

8. The system of claim 7, wherein instructing the docking system to engage the docking mechanism with the receptacle comprises aligning the support vehicle with the agricultural system based in part on using at least one proximity sensor of a sensor system of the support vehicle.

9. A method for refilling a resource of an agricultural system, comprising:
- determining a target location in a field to position a support vehicle based at least in part on terrain, obstacles, or any combination thereof, in the field;
- controlling the support vehicle such that the support vehicle is directed toward the target location; and
- instructing a transfer system of the support vehicle to activate a resource transfer device of the transfer system to transfer the resource from a container of the support vehicle to the agricultural system while the position of the agricultural system is within a threshold distance of the target location.

10. The method of claim 9, comprising instructing a docking system of the support vehicle to dock with the agricultural system.

11. The method of claim 9, comprising determining availability of the support vehicle for docking, a resource type of the resource, and an amount of the resource within the container.

12. The method of claim 11, wherein determining the availability of the support vehicle for docking comprises reporting an indication of whether the support vehicle is available for docking to the agricultural system or a communications base station.

13. The method of claim 11, wherein reporting the resource type of the resource comprises receiving resource identification information of the resource via a sensor of the support vehicle.

14. The method of claim 11, wherein reporting the amount of the resource within the container comprises receiving resource level information via a sensor of the support vehicle.

15. The method of claim 9, wherein determining the target location comprises receiving or determining a path of the agricultural system.

16. The method of claim 9, wherein determining the target location comprises receiving or determining an application rate of the agricultural system.

17. The method of claim 9, wherein determining the target location in the field to position the support vehicle comprises determining the target location in the field to position the support vehicle based at least in part on the terrain in the field.

18. A support vehicle for refilling a resource of an agricultural system, comprising:
- a container configured to store the resource;
- a locating system configured to output a first signal indicative of a position of the support vehicle;
- a transfer system comprising a resource transfer device; and
- a controller communicatively coupled to the locating system and the transfer system, wherein the controller comprises a processor and a memory, and the controller is configured to:
  - determine a target location in a field to position the support vehicle based at least in part on terrain, obstacles, or any combination thereof, in the field;
  - control the support vehicle such that the support vehicle is directed toward the target location; and
  - instruct the transfer system to activate the resource transfer device to transfer the resource from the container to a tank of the agricultural system while the position of the agricultural system is within a threshold distance of the target location.

19. The support vehicle of claim 18, comprising:

a speed control system communicatively coupled to the controller, wherein the controller is configured to instruct the speed control system to control a speed of the support vehicle; and a steering control system communicatively coupled to the controller, wherein the controller is configured to instruct the steering control system to control a direction of the support vehicle.

20. The support vehicle of claim 18, wherein the controller is configured to determine the target location in the field to position the support vehicle based at least in part on the terrain in the field.

* * * * *